No. 611,866. Patented Oct. 4, 1898.
E. PEHL & E. J. MARKEL.
APPARATUS FOR ASCERTAINING TEMPERATURE OF VAULTS.
(Application filed Oct. 8, 1897.)
(No Model.) 2 Sheets—Sheet I.
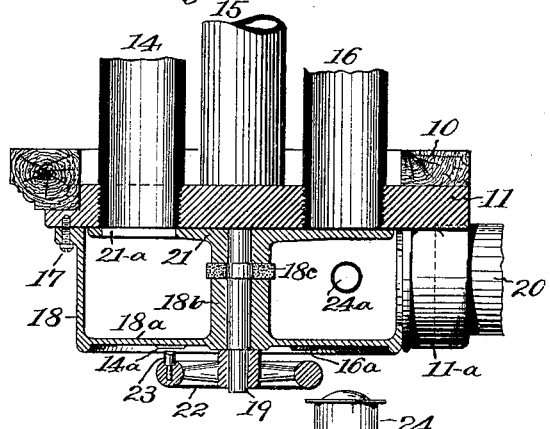
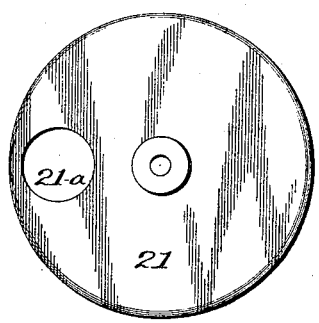
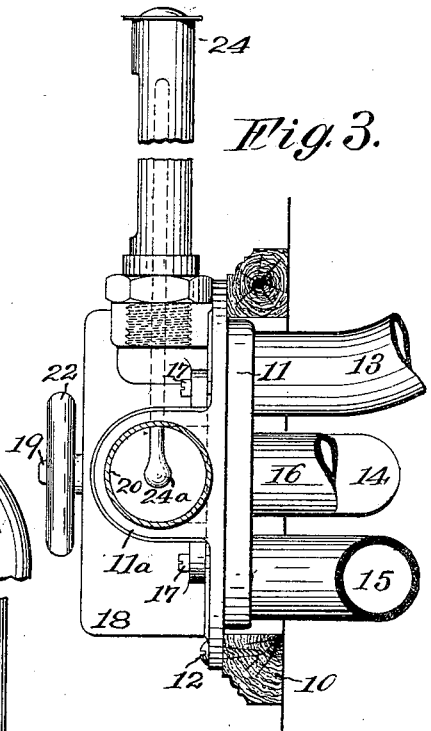
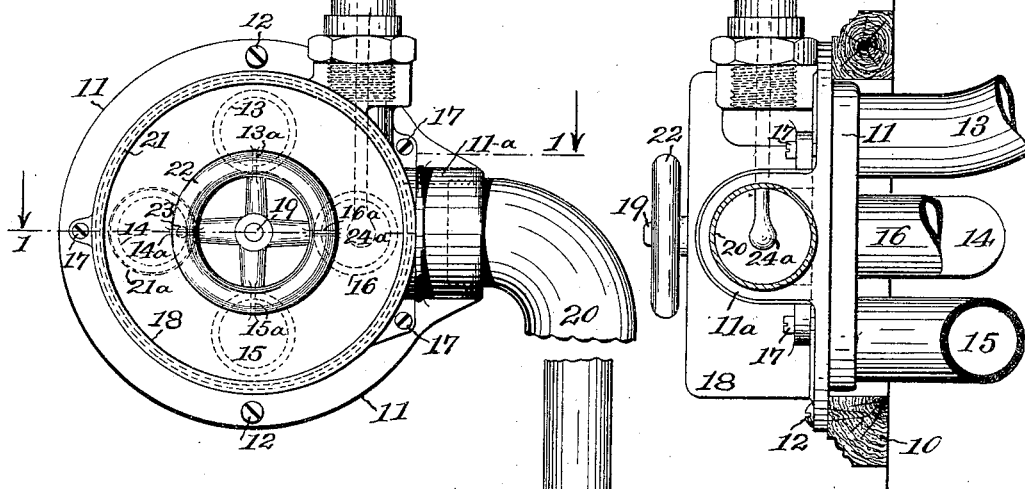
Witnesses:
Janette S. Ellsworth
L. E. Pike
Inventors:
Edmond Pehl.
Emerich J. Markel.
by Ed. E. Claussen
Atty.
THE NORRIS PETERS CO., PHOTO-LITHO., WASHINGTON, D. C.

No. 611,866. Patented Oct. 4, 1898.
E. PEHL & E. J. MARKEL.
APPARATUS FOR ASCERTAINING TEMPERATURE OF VAULTS.
(Application filed Oct. 8, 1897.)
(No Model.) 2 Sheets—Sheet 2.
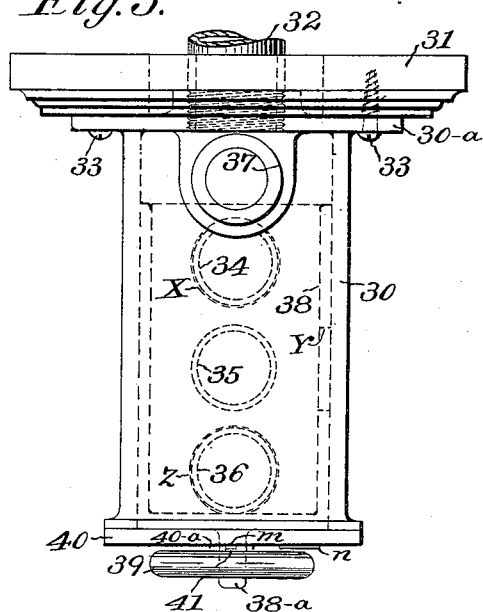
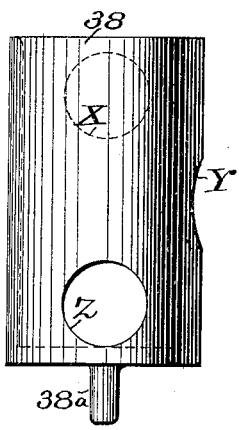
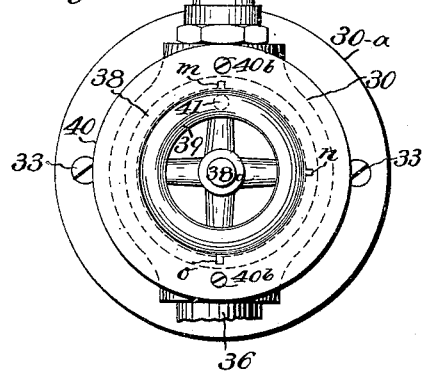
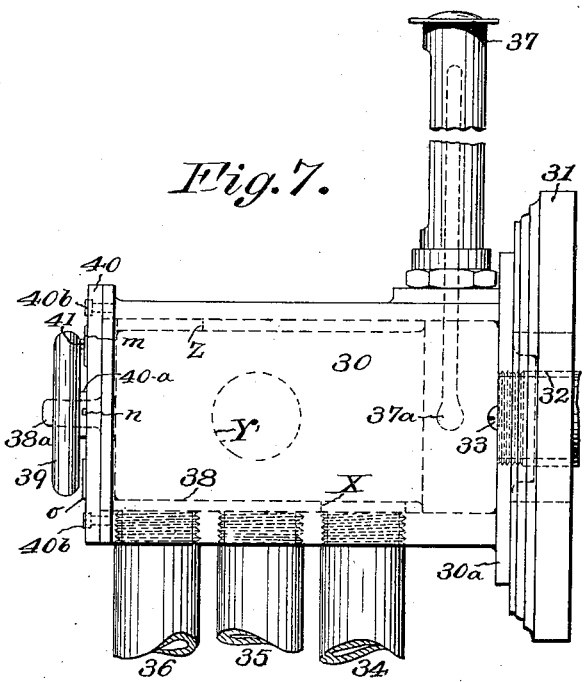
Witnesses:
Janette S. Ellsworth.
L. E. Pike.
Inventors:
Edmond Pehl.
Emerich J. Markel.
by Ed. E. Claussen
Atty.
THE NORRIS PETERS CO., PHOTO-LITHO., WASHINGTON, D. C.

UNITED STATES PATENT OFFICE.

EDMOND PEHL AND EMERICH J. MARKEL, OF HARTFORD, CONNECTICUT.

APPARATUS FOR ASCERTAINING TEMPERATURE OF VAULTS.

SPECIFICATION forming part of Letters Patent No. 611,866, dated October 4, 1898.

Application filed October 8, 1897. Serial No. 654,499. (No model.)

*To all whom it may concern:*

Be it known that we, EDMOND PEHL and EMERICH J. MARKEL, citizens of the United States, residing at Hartford, in the county of Hartford and State of Connecticut, have invented certain new and useful Improvements in Apparatus for Ascertaining the Temperature of Vaults, of which the following is a full, clear, and exact specification.

This invention relates to that class of apparatus which has for its object the ascertaining of temperatures, and is especially designed to establish with the utmost precision the temperatures of cold or warm storage vaults, either adjoining or at a distance.

The object of this invention is to provide a very simple and inexpensive device of this nature which is so constructed that it is safe and absolutely trustworthy to use, convenient to manipulate, and easy to regulate.

Referring to the accompanying drawings, Figure 1 represents a sectional plan view on the broken line 1 1 of Fig. 2 in the direction of the arrows. Fig. 2 is a front elevation of this device shown in its preferred construction and having, for the sake of clearness, the apparatus whereby the draft may be created, represented as a blower, drawn on a smaller scale. Fig. 3 represents a right-hand side view of what is shown in Fig. 2 and showing the pipes bent and branching off in different directions. Fig. 4 shows a front view of the valve. Figs. 5, 6, 7, and 8 illustrate a modification of our invention, Fig. 5 showing a plan view of the same, Fig. 6 a front view of what is shown in Fig. 5, Fig. 7 a side elevation of what is shown in Fig. 6, and Fig. 8 a detail construction of the valve.

In order to show clearly and fully the nature, importance, and desirability of our invention and the existing expensive, unreliable, and primitive manner in which the temperatures are at present ascertained, it is deemed necessary to set forth as briefly as possible the state of this particular branch of the art and the conditions under which arise the desirability and importance of our invention.

The present method as practiced in places where vaults and warm or cold storage houses are to be kept at certain temperatures—as, for instance, in cold-storage vaults of beef-packing houses, breweries, chemical works, malting establishments, &c.—is to have an employee go from vault to vault to take the observations and give the reports to the proper person in charge. The reports of these observations are, however, frequently unreliable and false, and thereby involving a great deal of trouble, and frequently great losses are the result, and not only this, but, furthermore, the occupation of entering the cold vaults from the hot engine and boiler rooms is very injurious to health and should be abolished if possible. Another disadvantageous feature of this present system is that in entering the vaults a vast amount of warm air enters when the doors are opened, thereby throwing more work on the refrigerating plant, thus involving a waste of coal.

The apparatus herein shown and described is adapted for attachment to the wall or partition of the engine-room, engineer's or superintendent's office, as the case may be, and consists of a series of tubes which are well covered and connect the various vaults with the apparatus, a rotatable valve having an opening, actuating mechanism in connection with the valve, a suitable casing for inclosing the valve, means for evacuating and effecting a suction from one of those pipes, a suitable instrument for registering the temperature, and an indicator for registering which vault is in connection with the apparatus.

In the various views the numeral 10 indicates a base-board rigidly fastened and supported at any convenient place which is easily accessible and in full view of the engineer or proper person in charge, and that base-board has fastened thereto by means of the screws 12 the base-plate 11, into which a series of pipes 13, 14, 15, and 16 are screwed about a common center and which branch off and are in communication with the various vaults and whereby air may be drawn from these vaults into the apparatus. Projecting laterally and outward from the base-plate 11 is the hub 11ᵃ, adapted for holding the exhaust-pipe 20 securely screwed therein, the purpose of which will be more fully explained hereinafter. To the base-plate 11 is securely fastened by the screws 17 the casing 18, of circular form, open at its lower side and closed on the upper side by the top wall 18$^a$, provided with the boss or hub 18$^b$, and that hub carries the shaft 19, which has mounted thereon the valve 21, provided with an opening 21$^a$, corresponding with and adapted to be carried over the openings of the pipes 13, 14, 15, and 16. On the outside of the casing and carried on the shaft 19 is the hand-wheel 22, having a pointer 23 attached thereto, and on the top wall 18$^a$ of the casing are indicating points or characters 13$^a$, 14$^a$, 15$^a$, and 16$^a$, whereby the operator can see when the opening 21$^a$ is over its respective pipe 13, 14, 15, or 16.

24 indicates in a general way a thermometer mounted on the casing in such a manner that the bulb 24$^a$ of the same is opposite the entrance of the exhaust-pipe 20. To evacuate the air, we have shown a blower 25 connected to the exhaust-pipe 20 and whereby the air may be drawn from the vault through the pipe over which the opening 21$^a$ of the valve 21 happens to be into the casing and past the bulb of the thermometer. To prevent the air from outside from passing into the casing, we have provided the shaft 19 with a felt washer 18$^c$ at the top of the hub of the valve, and which also serves to keep the valve 21 pressed against the seat of the base-plate 11.

In Figs. 5, 6, 7, and 8 we have shown our device in a modified form, and the same consists of the casing 30, securely held on any base-board 31, supported and fastened to any convenient partition. The casing consists of a cylindrical shell, of any suitable material, having the bottom end closed and provided with a hub which is internally threaded, into which the suction-pipe 32 is adapted to be threaded and which is in communication with a blower, pump, chimney, or any other mechanical apparatus whereby a draft is created. (Not shown in the drawings.) The casing is provided with a flange 30$^a$, by which it may be firmly held to the base-board 31 by screws 33. At one side (in this case shown as the lower side) the casing is connected with pipes 34, 35, and 36, communicating with the vaults and whereby the air may be drawn through the pipe into the casing and out through the suction-pipe 32. At the upper side of the casing and near its flange 30$^a$ is a hub provided with an internal thread, into which the thermometer 37 is screwed in such a manner that its bulb 37$^a$ will project down into the casing opposite the opening of the suction-pipe 32 and whereby the air passing out through the suction-pipe will come in contact therewith, the temperature to be properly indicated on its scale. Mounted in the casing is the valve 38, consisting of a cylindrical bushing having openings X, Y, and Z, arranged about the circumference at such distances apart that any one of the openings X, Y, or Z may be brought at any time over the opening of the pipes 34, 35, or 36. The valve is provided at its closed end with the stem 38$^a$, to which the hand-wheel 39 is fastened and whereby the valve may be set in communication with any of the pipes. The front end of the casing 30 is provided with a cover 40, held thereto by screws 40$^b$, the stem of the valve 38$^a$ passing through the central hub 40$^a$. Attached to the hand-wheel 39 is an indicator 41, and on the cover 40 are characters $m$, $n$, and $o$, indicating the position where the respective openings X, Y, and Z correspond with the openings of the pipes 34, 35, and 36, respectively.

The operation of our improved device as constructed and working in accordance with the description heretofore given is as follows: Presupposing that the device has been placed in position within ready reach of the person in charge and the pipes 13, 14, 15, and 16 are connected with the vaults of a cold-storage plant and to the casing, the valve being in position, as well as the thermometer in proper working order, and the blower revolving to create a draft, it is desired to ascertain the temperature in the vault leading from the pipe 13, the operator rotates the hand-wheel until the pointer 23 points over the character 13$^a$ on the wall of the casing, thereby turning the valve 21 into the position where the opening 21$^a$ comes over the pipe 13, permitting the air to be drawn from the vault through the pipe into the casing, around and past the bulb of the thermometer, through the exhaust-pipe. The thermometer will at once indicate the exact temperature, thereby saving a great deal of time and having to rely on the report of a second person, reliable or unreliable as that report may be.

In practice we preferably wrap the pipes leading from the vaults with any suitable covering—such as wool-felt, asbestos, or any other material—to prevent the surrounding air from coming in contact therewith and causing a difference in the temperature of the air of the vault and that passing through the same. In the drawings of Figs. 1, 2, and 3 we have shown the apparatus adapted to four pipes and connected to four vaults; but it is obvious that the same can be arranged for any number, more or less, according to the number of vaults and the purpose for which the apparatus is adapted, and we have represented in our modification in Figs. 5 to 8, inclusive, the apparatus provided with only three pipes communicating with three storage-vaults.

It is obvious that the means for creating a draft can be effected in a great many ways and by different mechanical appliances—such as fans, blowers, and pumps—or by connecting the exhaust-pipe with the chimney or erecting a pipe for that purpose, or by forcing the air from the vault through the pipes and the apparatus, and we have shown in the drawings a blower as the means for creating the draft, but do not wish to limit our invention to the particular means shown.

A great many modifications not shown or described may be made or other mechanism well known to any ordinary mechanic may be substituted without departing from the spirit of our invention, and, furthermore, it will be clearly seen that the several pipes may enter the casing at a great many different places other than those shown, according to the location of the vaults and depending upon the general arrangement and system of piping throughout the concern, as long as the general character of the apparatus is embodied therein.

Having thus described our invention, what we claim as new, and desire to secure by Letters Patent, is—

1. In an apparatus for ascertaining the temperature of vaults, the combination of the base-plate, pipes connecting the base-plate and the vaults and mounted about a common center, the casing mounted on the base-plate, the valve mounted inside of the casing on the hub of the same and adapted to cover the opening of the base-plate, the opening 21ª in the valve, the hand-wheel for operating the valve, and provided with the indicator, means for creating a draft, the thermometer for indicating the temperature of the air-current as it is drawn from the vault and mounted on the casing, all substantially as described.

2. In an apparatus for ascertaining the temperature of vaults, the combination of the base-plate, pipes connecting the base-plate and the vaults and mounted about a common center, the valve consisting of a flat circular plate adapted to cover the openings of the base-plate, the opening 21ª in the valve, the stationary casing adapted to inclose the valve and provided with the hub for supporting the stem of the valve, the hand-wheel mounted on the stem of the valve and provided with the indicator, means for creating a draft, the thermometer mounted on the casing, substantially as described and for the purpose set forth.

EDMOND PEHL.
EMERICH J. MARKEL.

Witnesses:
WILLIAM WARD,
EDWARD L. STEELE.